US011384635B2

(12) United States Patent
McMillon

(10) Patent No.: US 11,384,635 B2
(45) Date of Patent: Jul. 12, 2022

(54) DOWNHOLE ACOUSTIC LEAK DETECTION AND PROFILING

(71) Applicant: Halliburton Energy Services, Inc., Houston, TX (US)

(72) Inventor: Christopher M. McMillon, Wylie, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 341 days.

(21) Appl. No.: 16/311,980

(22) PCT Filed: Sep. 20, 2016

(86) PCT No.: PCT/US2016/052680
§ 371 (c)(1),
(2) Date: Dec. 20, 2018

(87) PCT Pub. No.: WO2018/056956
PCT Pub. Date: Mar. 29, 2018

(65) Prior Publication Data
US 2019/0211669 A1 Jul. 11, 2019

(51) Int. Cl.
*G01V 1/44* (2006.01)
*E21B 47/107* (2012.01)
*G01M 3/24* (2006.01)

(52) U.S. Cl.
CPC ............ *E21B 47/107* (2020.05); *G01M 3/24* (2013.01); *G01V 1/44* (2013.01)

(58) Field of Classification Search
CPC ........... E21B 47/107; G01M 3/24; G01V 1/44
See application file for complete search history.

(56) References Cited

U.S. PATENT DOCUMENTS

| 4,046,220 A * | 9/1977 | Glenn, Jr. ............... G01M 3/24 181/105 |
| 4,114,721 A * | 9/1978 | Glenn, Jr. ............ E21B 47/107 181/105 |
| 5,031,446 A | 7/1991 | Saito et al. |
| 5,214,251 A * | 5/1993 | Orban ................... E21B 47/085 181/102 |
| 8,430,163 B2 * | 4/2013 | Dupont .................... G01V 1/40 166/250.11 |
| 10,125,602 B2 * | 11/2018 | Al-Hussain .......... E21B 47/107 |
| 2002/0124633 A1 | 9/2002 | Yang et al. |
| 2011/0188346 A1 | 8/2011 | Hull |
| 2011/0220350 A1 * | 9/2011 | Daccord ............... E21B 21/003 166/254.1 |

(Continued)

FOREIGN PATENT DOCUMENTS

| EP | 1234101 B1 | 5/2003 |
| EP | 2446116 B1 | 11/2018 |
| WO | 2018056956 A1 | 3/2018 |

*Primary Examiner* — Ian J Lobo
(74) *Attorney, Agent, or Firm* — Thomas Rooney; Parker Justiss, P.C.

(57) ABSTRACT

A method for determining the location of a leak within a tubular having tubular components by sending an acoustic signal from an acoustic tool, receiving reflective signals from the acoustic signal, correlating the reflective signals with known tubular components, identifying an unexpected reflective signal and determining the location of a leak by correlating the location of the unexpected reflective signal with the known tubular components.

20 Claims, 3 Drawing Sheets

(56) References Cited

U.S. PATENT DOCUMENTS

2012/0018149 A1   1/2012  Fidan et al.
2015/0240619 A1*  8/2015  Frosell .................. E21B 47/00
                                              166/250.01

* cited by examiner

DOWNHOLE ACOUSTIC LEAK DETECTION AND PROFILING

CROSS-REFERENCE TO RELATED APPLICATION

This application is the National Stage of, and therefore claims the benefit of, International Application No. PCT/US2016/052680 filed on Sep. 20, 2016, entitled "DOWNHOLE ACOUSTIC LEAK DETECTION AND PROFILING," which was published in English under International Publication Number WO 2018/056956 on Mar. 29, 2018. The above application is commonly assigned with this National Stage application and is incorporated herein by reference in its entirety.

FIELD

The present disclosure generally relates to methods for detecting leaks in a pipe, casing or a tool string, such as determining a leak location in a downhole tool string positioned within a wellbore. Examples include identifying and determining a leak location in a wellbore servicing tool string, wellbore casing, production tubing or other downhole tubular configurations.

BACKGROUND

Natural resources such as oil and gas located in a subterranean formation can be recovered by drilling a wellbore down to the subterranean formation, typically while circulating a drilling fluid in the wellbore. The wellbore is drilled with the use of a tool string consisting of drill pipe, various tools and having a drill bit on the distal end. During the drilling of the wellbore drilling fluid is circulated through the tool string and the drill bit and returns up the annulus between the tool string and the wellbore. After the wellbore is drilled typically the tool string is pulled out of the wellbore and a string of pipe, e.g., casing, can be run in the wellbore. The drilling fluid is then usually circulated downwardly through the interior of the pipe and upwardly through the annulus between the exterior of the pipe and the walls of the wellbore, although other methodologies are known in the art.

Slurries such as hydraulic cement compositions are commonly employed in the drilling, completion and repair of oil and gas wells. For example, hydraulic cement compositions are utilized in primary cementing operations whereby strings of pipe such as casing are cemented into wellbores. In performing primary cementing, a hydraulic cement composition is pumped into the annular space between the walls of a wellbore and the exterior surfaces of the casing. The cement composition is allowed to set in the annular space, thus forming an annular sheath of hardened substantially impermeable cement. This cement sheath physically supports and positions the casing relative to the walls of the wellbore and bonds the exterior surfaces of the casing string to the walls of the wellbore. The cement sheath prevents the unwanted migration of fluids between zones or formations penetrated by the wellbore.

When the wellbore is being drilled it is desirable that there not be any leaks which could enable the drilling fluid to flow from the interior of the tool string to the annulus other than through the drill bit. Undetected leaks in a drill string can lead to major problems such as washouts, lost circulation, reduced bit performance, etc. Likewise once the wellbore is cased undetected leaks in the casing could enable fluid to flow from the subterranean formation into the cased wellbore. During completion operations undetected leaks in the completion tool string can lead to major problems. Likewise during production operations undetected leaks in production tubing can lead to reduced production volumes, undesirable comingling of streams and other problems.

Thus, a need exists for a practical method of determining whether there is a leak in a tubular string and a means of determining the location of the leak if one were to occur.

BRIEF DESCRIPTION OF DRAWINGS

The accompanying views of the drawing are incorporated into and form a part of the specification to illustrate several aspects and examples of the present disclosure, wherein like reference numbers refer to like parts throughout the figures of the drawing. These figures together with the description serve to explain the general principles of the disclosure. The figures are only for the purpose of illustrating preferred and alternative examples of how the various aspects of the disclosure can be made and used and are not to be construed as limiting the disclosure to only the illustrated and described examples. The various advantages and features of the various aspects of the present disclosure will be apparent from a consideration of the drawings.

DETAILED DESCRIPTION

Disclosed herein are methods of determining whether there is a leak in a tubular string and a means of determining the location of the leak if one is present. An embodiment is a method of determining the location of a leak in a tubular string, such as a wellbore servicing tool string, for example a drill string used to drill a wellbore within a subterranean formation, a casing string used to isolate the wellbore from the formation, a completion tool string or a production tool string.

There can be several embodiments to the present disclosure, each of which rely on the ability to utilize an acoustic signal.

Figure 1:
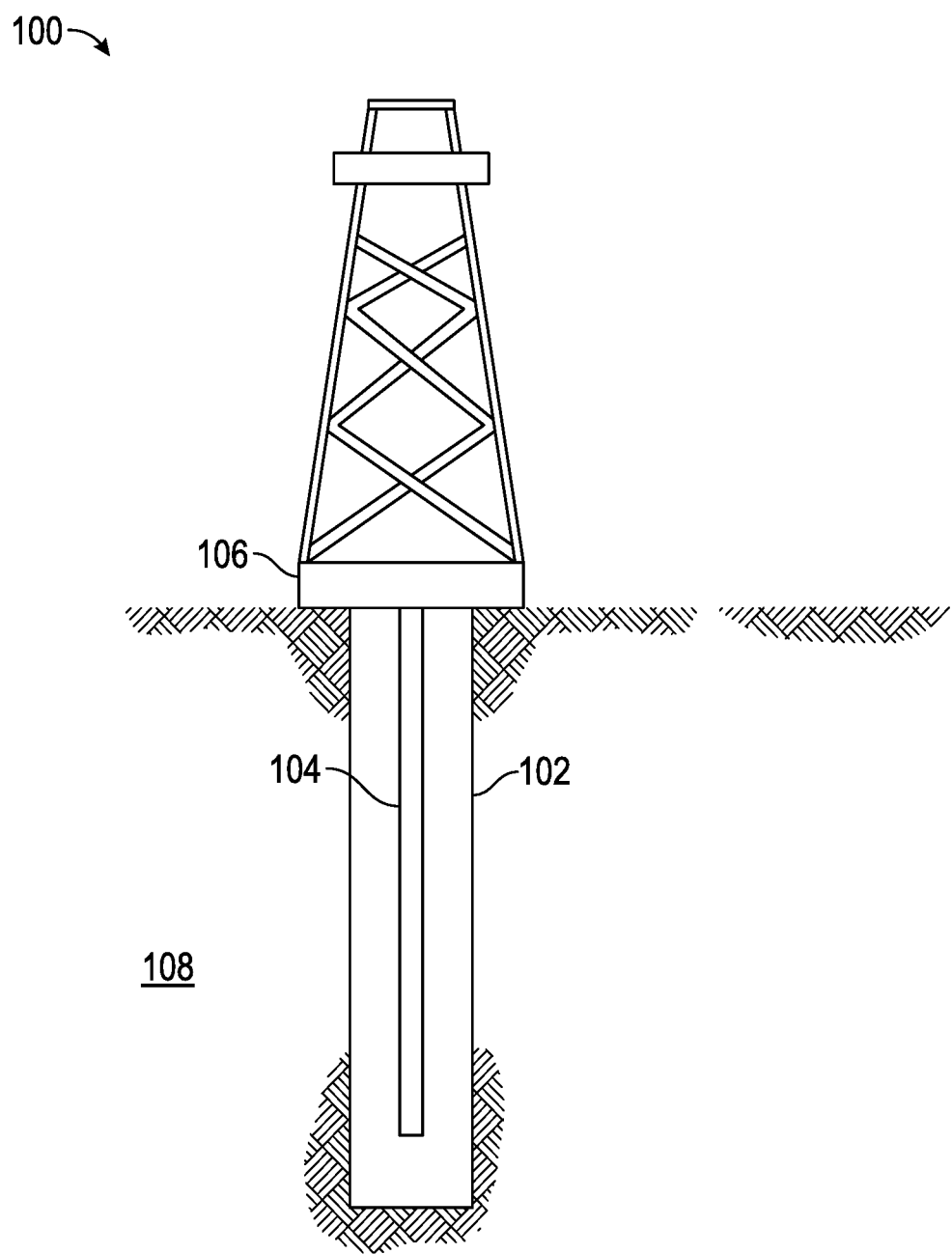
FIG. 1 is a schematic of a wellbore having a tubular string located therein.

To illustrate, FIG. 1 shows an illustrative schematic of a drilling rig 100 situated over wellbore 102 and a tubular 104 extending from wellhead 106 into subterranean formation 108. Although FIG. 1 is shown to depict a land-based system, it is recognized that like systems may be operated in offshore and subsea locations as well and that the examples given herein are for illustrative purposes and are not meant to be limiting the various embodiments of the present disclosure.

Figure 2A:
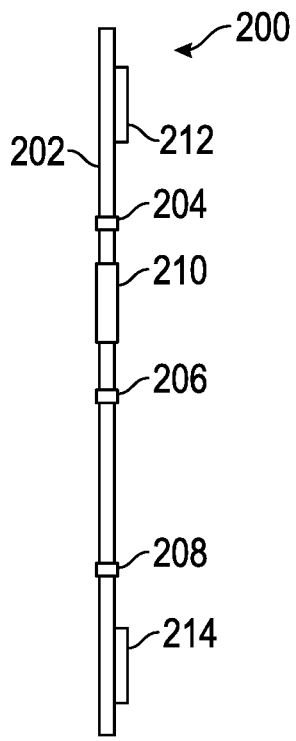
FIG. 2A is a schematic of a tool string and FIG. 2B is a corresponding echo profile.

FIG. 2A shows an illustrative schematic of a tool string 200 having a tubular string 202 with three tool joints 204, 206, 208. The tool string also includes a downhole tool 210, an upper acoustic tool 212 and a lower acoustic tool 214. The acoustic tools 212, 214 can be used to produce an echo profile of the tool string 200. The acoustic tools are capable of sending an acoustic signal and receiving a reflected signal from the acoustic reflections obtained by the signal interaction with components of the tool string. As the acoustic signal contacts a component of the tool string a portion of the signal is reflected back toward the acoustic source. This reflected signal can be detected and can be correlated to the component which it was reflected from. The reflected signals from multiple components can be correlated to generate a composite that is unique to the tool string and its components. The multiple reflected signals can be plotted, graphed or otherwise visually compiled to form an echo profile of the reflected signals.

Figure 2B:
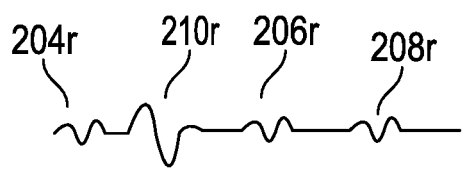

FIG. 2B shows an echo profile of the tool string 200 of FIG. 2A from an acoustic signal of upper acoustic tool 212 that is sent in the downward direction or toward the distal end of the tool string 200. Reading the profile from left to right reflections are seen for the tool joint 204 shown as 204r, tool 210 shown as 210r, tool joint 206 shown as 206r and tool joint 208 shown as 208r. The echo profile of the reflected signals from multiple components generates a composite that is unique to the tool string and its components.

Figure 3A:
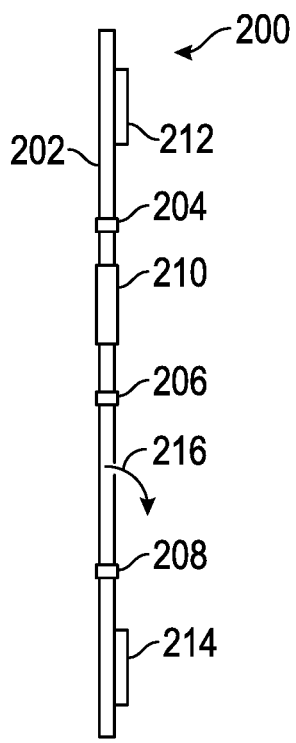
FIG. 3A is a schematic of a tool string and FIG. 3B is a corresponding echo profile.

FIG. 3A shows an illustrative schematic of the same tool string 200 as shown in FIG. 2A, although this embodiment has a leak 216 in the tool string that is located between tubular joint 206 and tubular joint 208.

Figure 3B:
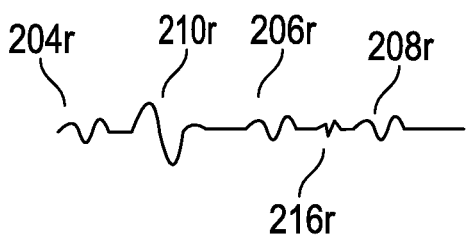

FIG. 3B shows an echo profile of the tool string 200 of FIG. 3A from an acoustic signal of upper acoustic tool 212 that is sent in the downward direction or toward the distal end of the tool string 200. Reading the profile from left to right reflections are seen for the tool joint 204 shown as 204r, tool 210 shown as 210r, tool joint 206 shown as 206r and tool joint 208 shown as 208r. An unexpected echo 216r is seen between tubular joint 206 and tubular joint 208. Since the unique echo profile of the tool string components are known, the unexpected echo 216r can be interpreted as a reflection from the tubular leak 216 that is located between tubular joint 206 and tubular joint 208.

Figure 4A:
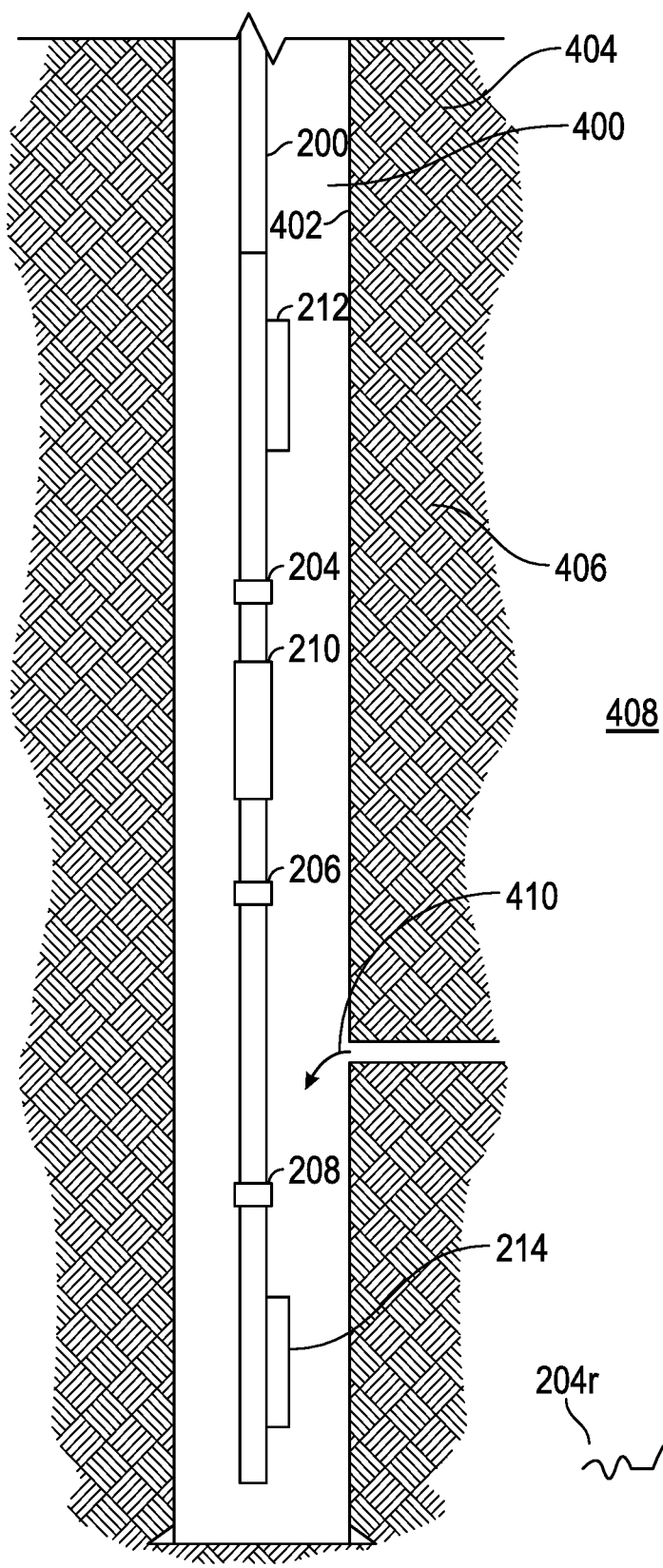
FIG. 4A is a schematic of a tool string and FIG. 4B is a corresponding echo profile.

FIG. 4A shows an illustrative schematic of the same tool string 200 as shown in FIG. 2A, located within a wellbore 400 that has a casing string 402 and an annulus area 404 that has been cemented with a cement sheath 406 to isolate the formation 408. In this embodiment there is a leak 410 in the casing string 402 that is located between tubular joint 206 and tubular joint 208 that facilitates a flow of fluids from the formation 408 into the wellbore 400.

Figure 4B:
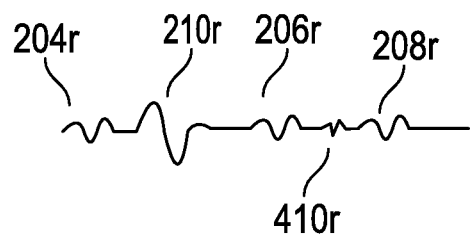

FIG. 4B shows an echo profile of the tool string 200 of FIG. 4A from an acoustic signal of upper acoustic tool 212 that is sent in the downward direction or toward the distal end of the tool string 200. Reading the profile from left to right reflections are seen for the tool joint 204 shown as 204r, tool 210 shown as 210r, tool joint 206 shown as 206r and tool joint 208 shown as 208r. An unexpected echo 410r is seen between tubular joint 206 and tubular joint 208. Since the unique echo profile of the tool string components are known, the unexpected echo 410r can be correlated as a reflection from the casing leak 410 that is located between tubular joint 206 and tubular joint 208.

If the upper acoustic tool 212 is capable of sending a focused acoustic signal toward the distal end of the tool string 200 the resulting echo profile will result in a directed response as shown in FIGS. 2B, 3B and 4B. If the acoustic signal is directed in both an upward direction (toward the proximal end of the tool string 200) and downward direction (toward the distal end of the tool string 200), the resulting echo profile will not by itself show whether the unexpected echo indicates a leak that is located in a direction that is proximal or distal from the tool. In this situation a second acoustic tool 214 can be utilized and the resulting echo profiles of both tools can be used to determine the location of the unexpected profile resulting from a leak. The unexpected profile resulting from a leak can be correlated to a location within the wellbore by comparing the echo profiles from each acoustic tool taking into account the acoustic tool locations and the known tool string configuration.

The methods of the present disclosure may be used during or in conjunction with any operation in a portion of a subterranean formation and/or wellbore, including but not limited to drilling operations, completion operations, pre-flush treatments, after-flush treatments, hydraulic fracturing treatments, sand control treatments (e.g., gravel packing), "frac pack" treatments, acidizing treatments (e.g., matrix acidizing or fracture acidizing), wellbore clean-out treatments, cementing operations, workover treatments/fluids, and other operations where a tubular toolstring or casing is used. For example, the methods of the present disclosure may be used in the course of drilling operations in which a wellbore is drilled to penetrate a subterranean formation. In certain embodiments, this may be accomplished using the pumping system and equipment used to circulate the drilling fluid in the wellbore during the drilling operation or completion fluids during completion or remediation operations.

The methods disclosed herein can be used to identify leaks in various tubular strings, such as in drill strings, casing strings, completion workstrings, production tubing to name a few. The methods claimed herein are not to be limited by the particular tubular string or by any specific order of tools therein, nor are they limited by any particular type of acoustic tool or source of acoustic signal.

In an embodiment of the present disclosure a method for determining the location of a leak within a tubular includes sending an acoustic signal from an acoustic tool. The acoustic signal is reflected off of tubular components and the reflective signals from the acoustic signal are received. The reflective signals are correlated with known tubular components. An unexpected reflective signal from the leak is identified and the location of a leak is determined by correlating the location of the unexpected reflective signal with the reflective signals from the known tubular components.

In an embodiment the correlating of the reflective signals with known tubular components includes making an echo profile of the reflective signals and matching the reflective signals of the echo profile with expected reflective signals from known tubular components. This process can include determining distinctive reflective signals for particular tubular components.

The method can optionally include two or more acoustic tools are used to send acoustic signals, one of the acoustic tools being located at a position that is further distal on the tool string than the other acoustic tool. The multiple acoustic tools can generate two echo profiles can be used to correlate the location of the unexpected reflective signal with the reflective signals from the known tubular components.

In an embodiment a method for determining the location of a leak within a tubular string within a wellbore is disclosed. The method using at least two acoustic tools located on the tubular string, the acoustic tools being located at positions of differing distal lengths along the tubular string. Acoustic signals from the acoustic tools are generated and reflective signals are received. The reflective signals are graphed to form echo profiles. The reflective signals of the echo profiles are then correlated with expected reflective signals from known tubular components. An unexpected reflective signal due to a leak is identified and the location of a leak is determined by correlating the location of the unexpected reflective signal with the reflective signals from the known tubular components of the echo profiles.

An alternate embodiment is a method for determining the location of a leak within a drill string within a wellbore by having an acoustic tool located on the drill string. Acoustic signals are sent from the acoustic tool and reflective signals from the acoustic signal are received. The reflective signals to form an echo profile wherein the reflective signals of the echo profile are correlated with expected reflective signals from known tubular components. The location of a leak within the drill string is determined by identifying an unexpected reflective signal due to the leak. The location of the unexpected reflective signal is determined by correlating the reflective signals from the known drill string components of the echo profile.

The various embodiments of the present disclosure can be joined in combination with other embodiments of the disclosure and the listed embodiments herein are not meant to limit the disclosure. All combinations of various embodiments of the disclosure are enabled, even if not given in a particular example herein.

While illustrative embodiments have been depicted and described, modifications thereof can be made by one skilled in the art without departing from the scope of the disclosure. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted. While compositions and methods are described in terms of "comprising," "containing," or "including" various components or steps, the compositions and methods can also "consist essentially of" or "consist of" the various components and steps. Also, the terms in the claims have their plain, ordinary meaning unless otherwise explicitly and clearly defined by the patentee.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples.

Numerous other modifications, equivalents, and alternatives, will become apparent to those skilled in the art once the above disclosure is fully appreciated. While embodiments of the disclosure have been shown and described, modifications thereof can be made by one skilled in the art without departing from the teachings of this disclosure. The embodiments described herein are exemplary only, and are not intended to be limiting. Many variations and modifications of the disclosure disclosed herein are possible and are within the scope of the disclosure.

Use of the term "optionally" with respect to any element of a claim is intended to mean that the subject element is required, or alternatively, is not required. Both alternatives are intended to be within the scope of the claim. It is intended that the following claims be interpreted to embrace all such modifications, equivalents, and alternatives where applicable. Other and further embodiments, versions and examples of the disclosure may be devised without departing from the basic scope thereof and the scope thereof is determined by the claims that follow.

The invention claimed is:

1. A method for determining a location of a leak within a tubular string within a wellbore having known components along the tubular string during drilling operations, completion operations, or hydraulic fracturing operations in a portion of the wellbore, comprising:
   sending an acoustic signal from an acoustic tool located on the tubular string;
   receiving reflective signals by the acoustic tool located on the tubular string from the acoustic signal;
   correlating the reflective signals with the known components along the tubular string;
   identifying at least one reflective signal that does not correlate with any of the known components along the tubular string; and
   determining the location of the leak within the tubular string during the drilling operations, completion operations, or hydraulic fracturing operations in a portion of the wellbore by correlating a location of the at least one reflective signal that does not correlate with any of the known components along the tubular string with locations of the reflective signals that do correlate with the known components along the tubular string.

2. The method of claim 1, wherein correlating the reflective signals with the known components along the tubular string comprises matching actual reflective signals with reflective signals expected from the known components along the tubular string.

3. The method of claim 1, wherein the received reflective signals form an echo profile.

4. The method of claim 3, wherein correlating the reflective signals with the known components along the tubular string comprises matching reflective signals of the echo profile with reflective signals expected from the known components along the tubular string.

5. The method of claim 4, wherein the matching reflective signals of the echo profile with the reflective signals expected from the known components along the tubular string further comprises determining distinctive reflective signals for particular ones of the known components along the tubular string.

6. The method of claim 1, wherein more than one acoustic tool is used to send an acoustic signal.

7. The method of claim 6, wherein two acoustic tools are used to send acoustic signals, one of the acoustic tools being located at a position that is further distal on the tubular string than the other acoustic tool.

8. The method of claim 7, wherein the two acoustic tools are used to form two echo profiles.

9. The method of claim 8, wherein the two echo profiles are used to correlate the location of the reflective signal that does not correlate with any of the known components along the tubular string with the locations of the reflective signals that do correlate with the known components along the tubular string.

10. The method of claim 1, wherein the tubular string is a drill string.

11. The method of claim 1, wherein the tubular string is a casing string.

12. The method of claim 1, wherein the tubular string is a completion workstring.

13. The method of claim 1, wherein the tubular string is a production tubing string.

14. A method for determining a location of a leak within a tubular string within a wellbore during drilling operations, completion operations, or hydraulic fracturing operations in a portion of the wellbore, the tubular string having known components along the tubular string, the method comprising:
- having at least two acoustic tools located on the tubular string within the wellbore, the acoustic tools being located at positions of differing distal lengths along the tubular string;
- sending acoustic signals from the acoustic tools;
- receiving reflective signals by the at least two acoustic tools located on the tubular string from the acoustic signals;
- graphing the reflective signals to form echo profiles;
- correlating the reflective signals of the echo profiles with the known components along the tubular string;
- identifying at least one reflective signal that does not correlate with any of the known components along the tubular string; and
- determining the location of the leak within the tubular string during the drilling operations, completion operations, or hydraulic fracturing operations in a portion of the wellbore by correlating a location of the at least one reflective signal that does not correlate with any of the known components along the tubular string with locations of the reflective signals of the echo profiles that do correlate with the known components along the tubular string.

15. The method of claim 14, further comprising determining distinctive reflective signals for particular ones of the known components along the tubular string.

16. The method of claim 14, wherein the tubular string is a drill string.

17. The method of claim 14, wherein the tubular string is a casing string.

18. The method of claim 14, wherein the tubular string is a completion workstring.

19. The method of claim 14, wherein the tubular string is a production tubing string.

20. A method for determining a location of a leak within a drill string within a wellbore during drilling operations, completion operations, or hydraulic fracturing operations in a portion of the wellbore, the drill string having known components along the drill string, the method comprising:
- having an acoustic tool located on the drill string within the wellbore;
- sending acoustic signals from the acoustic tool;
- receiving reflective signals by the acoustic tool located on the drill string from the acoustic signals;
- graphing the reflective signals to form an echo profile;
- correlating the reflective signals of the echo profile with the known components along the drill string;
- identifying at least one reflective signal that does not correlate with any of the known components along the drill string; and
- determining the location of the leak within the drill string during the drilling operations, completion operations, or hydraulic fracturing operations in a portion of the wellbore by correlating a location of the at least one reflective signal that does not correlate with any of the known components along the drill string with locations of the reflective signals of the echo profile that do correlate with the known components along the drill string.

* * * * *